United States Patent [19]
Antenore

[11] 4,136,338
[45] Jan. 23, 1979

[54] PERIMETER ALARM APPARATUS

[75] Inventor: Ronald L. Antenore, Coral Gables, Fla.

[73] Assignee: James D. Pauls & Associates, Ltd., Miami, Fla.

[21] Appl. No.: 775,478

[22] Filed: Mar. 8, 1977

[51] Int. Cl.² ............................................. H04B 5/00
[52] U.S. Cl. ...................................... 340/551; 179/82; 325/29; 340/531; 340/568
[58] Field of Search ............... 340/224, 258 R, 258 B, 340/258 C, 280; 343/225, 100 AD, 100 CS; 325/29; 179/82

[56] References Cited

U.S. PATENT DOCUMENTS

| | | | |
|---|---|---|---|
| 3,115,622 | 12/1963 | Jaffe | 340/224 |
| 3,665,449 | 5/1972 | Elder et al. | 340/280 |
| 3,673,334 | 6/1972 | Turner | 179/82 |
| 3,868,565 | 2/1975 | Kuipers | 324/34 R |

FOREIGN PATENT DOCUMENTS 1043822 9/1966 United Kingdom ...................... 179/82

Primary Examiner—John W. Caldwell, Sr.
Assistant Examiner—Joseph E. Nowicki
Attorney, Agent, or Firm—Dennis H. Lambert

[57] ABSTRACT

A perimeter alarm apparatus includes a loop of wire to be placed around an area to be guarded and electrical circuitry connected with the loop for detecting the absence of a signal imposed on the loop. The signal imposed on the loop is produced by a sending unit worn by a child, for example, who is intended to remain within the area bounded by the loop. As long as the child is within the area, the sending unit will induce a signal on the loop, but when the child moves beyond the loop a predetermined distance, no signal is imposed on the loop, with the result that an alarm is sounded by the circuitry.

10 Claims, 12 Drawing Figures

PERIMETER ALARM APPARATUS

BACKGROUND OF THE INVENTION

This invention relates to alarm apparatus, and more particularly, to an alarm apparatus which detects the presence of a signal to maintain the apparatus in a non-alarm condition. When the signal is absent, the alarm apparatus is operable to detect the absence of the signal and go into alarm.

Still more particularly, the alarm apparatus of the invention includes a loop of wire placed around an area to be guarded and electrical circuitry is connected with the wire loop for detecting signals imposed on the loop. A child or the like within the area bounded by the wire is provided with a sending unit or transmitter which imposes a signal on the loop so long as the child remains within the area bounded by the loop, and the alarm circuitry thus remains in a non-alarm condition. However, in the event the child or the like goes beyond the area bounded by the loop, the transmitter worn by him no longer imposes a signal on the loop, with the result that the alarm circuitry enters an alarm condition.

The advantages of such an alarm apparatus are apparent. Children like to explore and child psychologists believe that exploration is important to a child's natural development. However, since a child is generally naive about the dangers in his environment, it is not generally regarded safe to permit a child to explore without close supervision. Since close supervision is not always convenient or possible, small children are placed in playpens and other confinements. If these confinements are used excessively, they can hinder healthy development of the child. The present invention solves parents' dilemma of how to let their children play in the open without having to constantly be watched.

OBJECTS OF THE INVENTION

Accordingly, it is an object of this invention to provide an alarm apparatus which enables a parent or the like to select an area to be guarded and to then permit a child to play in the area with the secure knowledge that if the child leaves the area an alarm will be sounded, thus alerting the parent or the like to the fact that the child has left the designated area.

A further object of the invention is to provide an alarm apparatus for guarding an area in which a child is intended to remain and wherein the area can easily be changed or modified simply be relocating a perimeter loop of wire which defines the boundaries of the area.

A still further object of the invention is to provide an alarm apparatus for indicating when a child leaves a designated area, and which includes a transmitter that may be worn by the child and wherein means is provided to sound an alarm in the event the child should remove the transmitter from his person.

Yet another object of the invention is to provide an alarm apparatus which includes means for detecting the presence of a child or children in a designated area and which includes circuit means for distinguishing between different children to give an indication of which child has left the area or removed the alarm transmitter from his person.

An even further object of the invention is to provide an alarm apparatus for guarding children wherein the apparatus is not sensitive to two-way radios, garage door electronics, horns, noises or other types of external interference.

An even further object of the invention is to provide an alarm apparatus which is transportable and which can be taken to any place where it is desired to designate a protected area in which a child can safely play.

An even further object of the invention is to provide an alarm apparatus for guarding a designated area in which a child can safely play and which indicates when the child leaves the area and wherein the alarm apparatus is simple and economical in construction.

BRIEF DESCRIPTION OF THE DRAWINGS

FIG. 1 is a diagrammatic plan view of one manner in which an alarm apparatus according to the invention can be utilized to protect a safe play area for a child or the like.

FIG. 2 is a block diagram of the sending unit or transmitter worn by the child or the like.

DETAILED DESCRIPTION OF THE INVENTION

Figure 1:
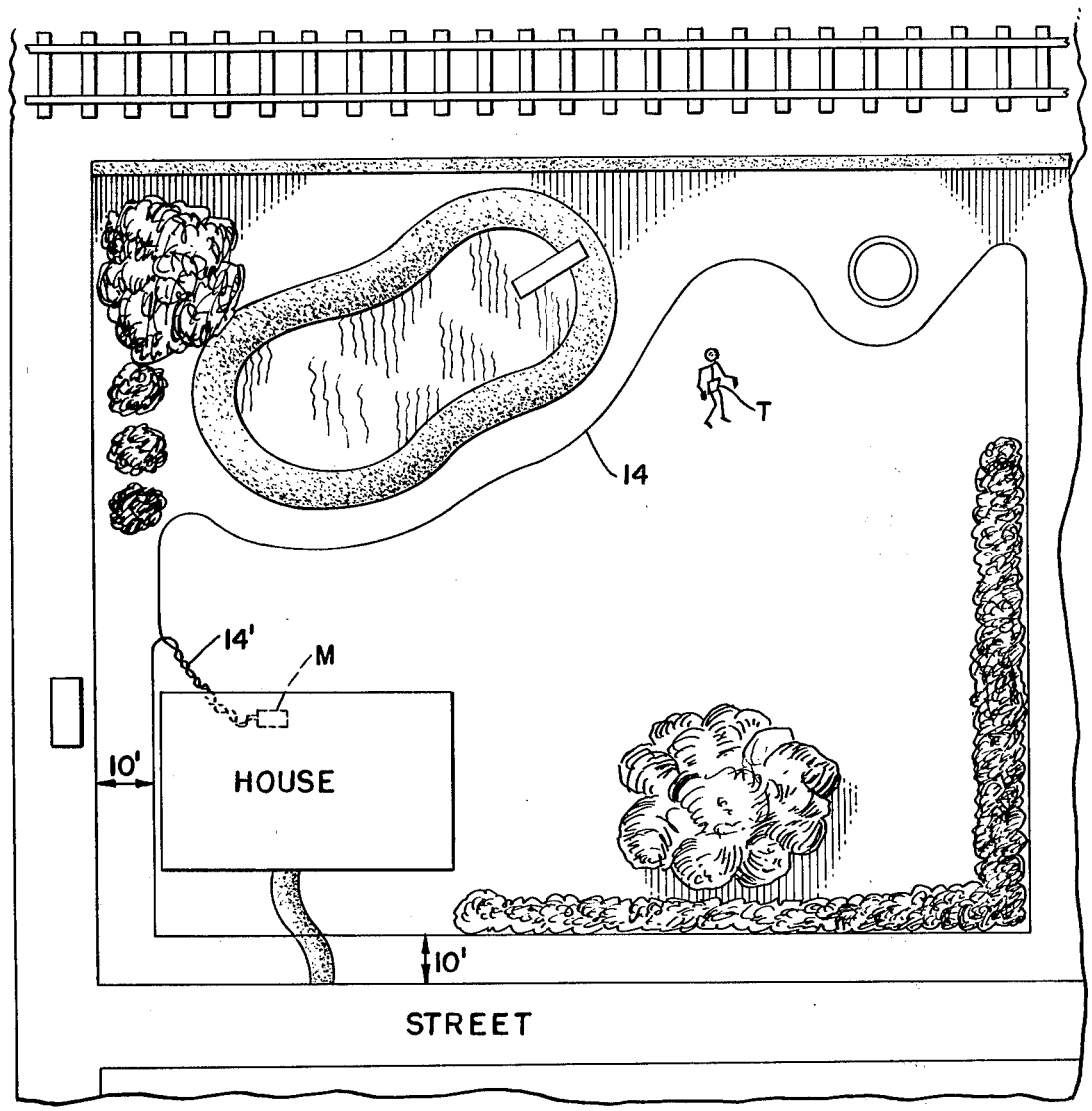
Figure 2:
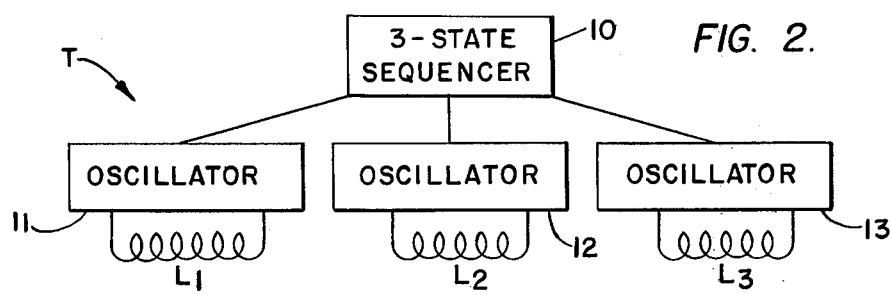
Figure 3:
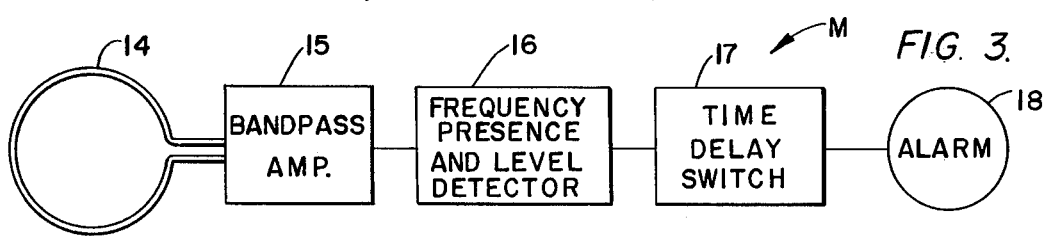
FIG. 3 is a block diagram of the monitor or alarm circuitry and perimeter loop of the invention.

The alarm apparatus of the invention essentially comprises a monitor M and a transmitter or monitor activator T. The transmitter T is quite small and may be housed in any suitable structure, as, for example, a badge or other configuration appealing to a child or the like intended to wear the transmitter.

The transmitter T includes a sequencer 10 connected with three oscillators 11, 12 and 13 preferably of the Hartley type which alternately energize coils L1, L2 and L3 to create magnetic flux lines. The monitor M includes a perimeter loop 14 connected with a bandpass filter and amplifier circuit 15 which in turn is connected with a frequency and level detector 16 which operates a time delay circuit 17 to energize an alarm 18 when the necessary signal is absent for a predetermined period of time.

Coupling between the transmitter T and perimeter loop 14 is by magnetic induction upon energization of the coils L1, L2 and L3. In this connection, the three coils are mutually perpendicular, whereby it is insured that one coil will always be arranged with its axis within 45 degrees of the axis of the perimeter loop. Additionally, operation of the oscillators is such that each one is turned on for approximately 100 milliseconds at a time, and accordingly, in a 300 millisecond period each one of the coils will be energized for 100 milliseconds. Thus, sufficient voltage is induced in the perimeter loop for at least 100 milliseconds of each 300 millisecond period, regardless of the orientation of the transmitter.

Figure 11:
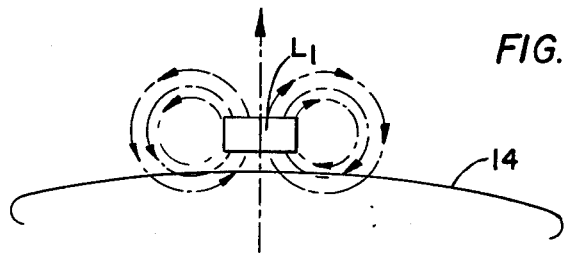
FIG. 11 is a diagrammatic view of the transmitter flux lines for one coil thereof.
Figure 12:
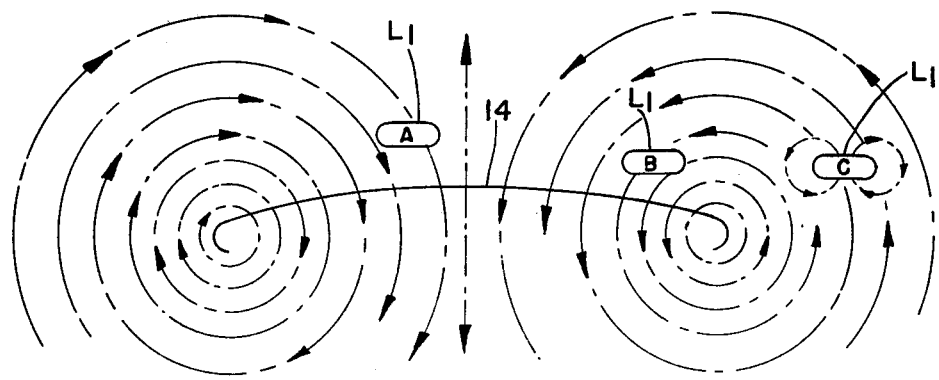
FIG. 12 is a diagrammatic view of the perimeter loop flux lines and showing the relative relationship between the loop flux lines and the transmitter coil in each of several positions.

As seen best in FIGS. 11 and 12, the magnetic field generated by coil L1, for example, is doughnut-shaped, with the flux density greatest through the coil center and gradually weakening outside the coil. Since the magnetic field is changing, it induces a voltage in the perimeter loop in a manner to cause current to flow in the loop in a direction tending to set up an opposing magnetic field. By comparing coil L1's magnetic field with the induced magnetic field in the perimeter loop 14, the opposition and hence induced voltage may be deduced. In other words, when the transmitter is in a position such as indicated by A in FIG. 12, most of the lines of force or flux lines from coil L1 oppose the induced field in the perimeter loop and voltage is induced in the perimeter loop. At position B the greatest amount of voltage is induced in the perimeter loop since the greatest number of conflicting lines of force are present at this position. When the transmitter is moved outside the perimeter loop to position C, for example, the induced voltage in the perimeter loop is reduced, since there are less lines of force in conflict than in positions A and B.

Figure 10:
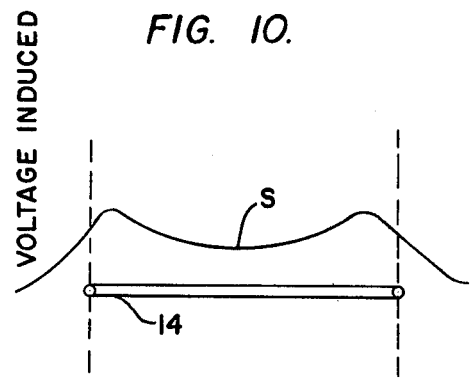
FIG. 10 is a diagrammatic chart of the signal strength relative to the perimeter loop.

The relative strength of the induced signal in the perimeter loop is diagrammatically illustrated in FIG. 10. As can be seen, some voltage is induced in the perimeter loop even when the transmitter is outside the loop. This distance may be varied, depending upon details of the circuitry, but in the particular invention described and for the application or use intended for the invention, the distance beyond the loop within which voltage will be induced in the loop is about 10 feet.

The voltage induced in the loop 14 is fed through bandpass filter and amplifier 15 which reduces extraneous noise and amplifies the desired signal. The signal is then fed to the frequency and level detector which includes a phase lockedloop tone decoder. Upon the presence of a signal with a frequency within the lock range of the phase locked loop, the output of the phase locked loop continually resets the time delay circuit 17, which includes circuitry establishing a 500 millisecond time delay. Thus, if the induced voltage or desired signal is absent or drops below a predetermined minimum, the output of the frequency and level detector 16 fails to reset the time delay and 500 milliseconds after the absence of the signal is detected, the alarm 18 is turned on. If the appropriate signal is induced on the perimeter loop prior to expiration of the 500 millisecond time delay, then the time delay will be reset and the alarm will not be energized.

Figure 8:
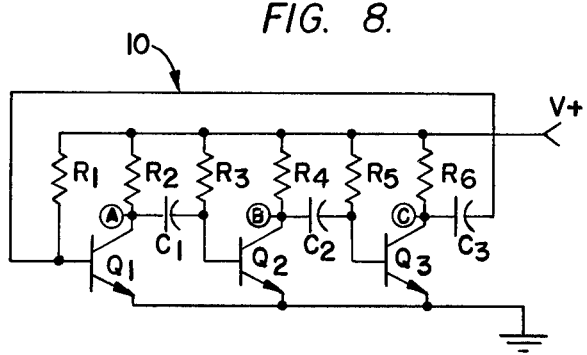
FIG. 8 is a schematic circuit diagram of the sequencer circuit of the transmitter.
Figure 9:
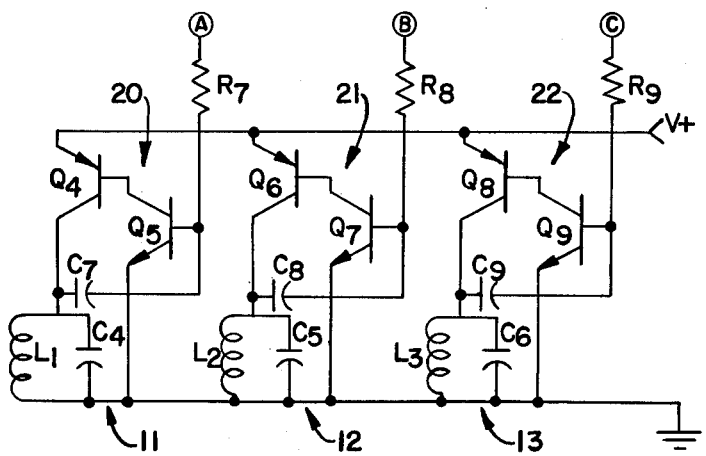
FIG. 9 is a schematic circuit diagram of the oscillator portion of the transmitter.

The monitor activator or transmitter includes a power supply P comprising a battery B which is preferably three nickel cadmium rechargeable batteries connected with a selector switch S1 for selectively connecting the battery with a pair of charging contacts 19 for charging the batteries or with an on/off switch S2 for supplying power to the sequencer circuit 10 in FIG. 8. The sequencer circuit 10 includes three transistors Q1, Q2 and Q3 and the output of one of the transistors is high at any given time and the outputs of the remaining two transistors are low. Assume that the selector switch S1 is closed to supply power from the battery through switch S2 which is also assumed to be closed to the sequencer circuit. Further, assume that transistor Q1 is turned on first upon the supply of power thereto. Its output goes low and this low is coupled through capacitor C1 to the base of transistor Q2, turning Q2 off. The collector of transistor Q2 then goes high until the capacitor charges through transistor Q2's bias resistor R3. When capacitor C1 is charged, Q2's collector goes low and this low is coupled through capacitor C2 to the base of transistor Q3. Thus, Q3's collector goes high until capacitor C2 is charged through Q3's associated bias resistor R5. Similarly, transistor Q3's return to the low state causes Q1's collector to go high until Q3's associated capacitor C3 is charged through bias resistor R1. Thus, the transistors are turned on consecutively, with each transistor collector going high for approximately 100 milliseconds, and this cycle is continuously repeated. The collectors of transistors Q1, Q2 and Q3, respectively, are connected through resistors R7, R8 and R9 with the base of transistors Q5, Q7 and Q9 in the oscillator circuitry 11, 12 and 13, respectively. Therefore, when the collector of one of the transistors Q1, Q2 and Q3 goes high, it turns on its respective oscillator 11, 12 or 13. As noted previously, the oscillators are preferably of the Hartley type and the frequency of operation of the oscillators is the same and is approximately 110 kHz. The collectors of transistors Q5, Q7 and Q9 are connected, respectively, with the base of transistors Q4, Q6 and Q8 and the combinations of Q4, Q5, Q6, Q7 and Q8, Q9 form three high gain, non-inverting amplifiers 20, 21 and 22. Each amplifier operates into a parallel resonant circuit load comprising capacitors C4, C5 and C6, respectively, and coils L1, L2 and L3. Voltage across the load is fed back to the base of the input transistors Q5, Q7 and Q9 through their respective capacitors C7, C8 and C9. This positive feedback causes oscillation at a frequency determined by the resonant frequency of the load circuitry. The bias current for the oscillators is supplied through the resistors R7, R8 and R9. The frequency of all the oscillators is the same, and as noted previously, is approximately 110 kHz.

Figure 6:
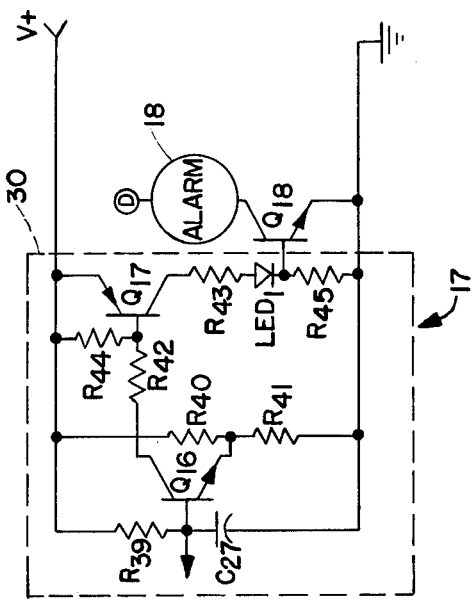
FIG. 6 is a schematic circuit diagram of the alarm monitor timer portion of the circuitry.
Figure 4:
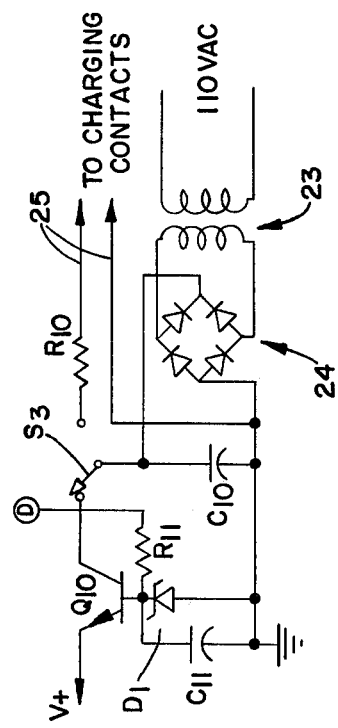
FIG. 4 is a schematic circuit diagram of the monitor power supply.
Figure 5:
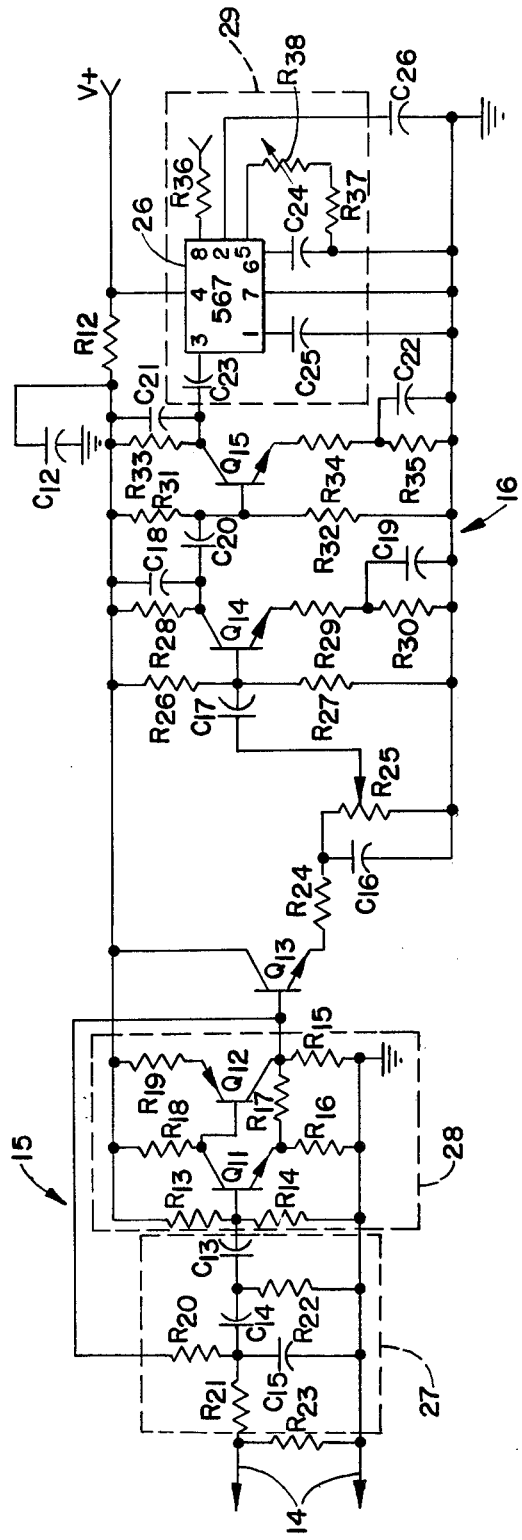
FIG. 5 is a schematic circuit diagram of the amplifier and filter portions of the alarm monitor circuitry.
Figure 7:
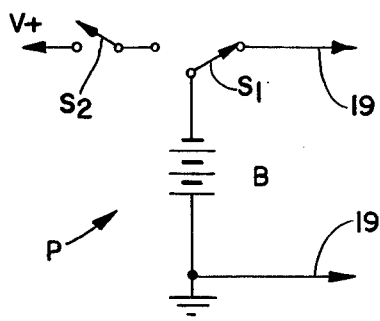
FIG. 7 is a schematic circuit diagram of the transmitter or sending unit power supply.

The monitor and alarm circuitry and the power supply therefor are shown in FIGS. 4, 5 and 6, and as illustrated in FIG. 4, the power supply is taken from a source of 110 VAC. The 110 VAC is stepped down in a power transformer 23 to approximately 12.6 VAC and supplied to a full wave bridge rectifier 24 which converts the stepped down alternating current to direct current. The stepped down, rectified power is filtered by capacitor C10. Switch S3 may be positioned to supply the stepped down filtered power through a resistor R10 to a pair of charging contacts 25 for charging the battery B in the transmitter power supply. Alternatively, and as shown in FIG. 4, the switch S3 is normally positioned to supply power to a regulator circuit including resistor R11, zener diode D1 and transistor Q10. The rectified current flows through resistor R11 and the zener diode D1 establishing a reference voltage at the base of transistor Q10. A capacitor C11 helps maintain the reference level voltage constant by providing a low impedance shunt path for alternating current components present at the zener diode due to its dynamic impedance. The transistor Q10 maintains its emitter at a base-emitter voltage drop below the reference level to obtain a 7.5 volt DC output.

The 7.5 volts DC is supplied to the amplifier section 16 and as seen in FIG. 5, provides an input to pin 4 of integrated circuit chip 26. The stepped down regulated and rectified power is also supplied to a bandpass filter and amplifier 15. A capacitor C12 connected adjacent resistor R12 filters out power bus noise generated by the integrated circuit chip 26.

The bandpass filter and amplifier 15 includes a filter section 27 and a section 28 functioning as an operational amplifier. Bias resistors R13 and R14 set the bias point for transistor Q11 and current flows into the collector of Q11 and from the base of Q12, turning Q12 on. The collector current of transistor Q12 then develops a voltage across resistor R15 and across the series combination of resistors R16 and R17. The voltage present at the juncture of resistors R16 and R17 and the emitter of transistor Q11 rises until the bias point of the transistor minus 0.6 volts has been reached. At this point, transistor Q11 begins to turn off, hence turning transistor Q12 off. Thus, the output across transistor Q11 remains at a point which is determined by the bias resistors R13 and R14. Moreover, since the output is fed back to the emitter of transistor Q11, the gain is determined by the voltage divider action of resistors R16 and R17. This combination has a high input impedance, a settable gain and a low output impedance, and is similar to the characteristics of an operational amplifier. This amplifier 28 is then used as the operational amplifier in an active filter design. The filter 27 is of the VCVS (voltage controlled voltage source) type and is of conventional design given in filter design handbooks. The filter 27 has a center frequency of 110 kHz, a quality of 4 and a gain of 10, and includes resistors R20, R21 and R22 and capacitors C13, C14 and C15. The input signal from perimeter loop or coil 14 is thus amplified and filtered by the bandpass amplifier and filter 15. A resistor R23 is connected across the proximate ends of the perimeter loop 14 to provide a low input impedance to the filter should the perimeter loop break near the grounded end, thus preventing the broken loop from acting as an antenna and picking up noise which might prevent proper operation of the alarm circuitry.

The output of the bandpass filter and amplifier stage 15 is coupled to the base of emitter follower transistor Q13, which has its emitter connected to a load comprised of resistor R24, potentiometer R25 and capacitor C16. The capacitor C16 in conjunction with resistor R24 and the base-emitter resistance of transistor Q13 forms a low pass filter with a corner frequency of approximately 200 kHz. The gain may be set by means of potentiometer R25. The signal from the potentiometer is fed through capacitor C17 to the base of transistor Q14 in a first amplifier stage, and the base of which is provided by resistors R26 and R27. A resistor R28 and capacitor C18 are connected in parallel on the collector of transistor Q14 and resistors R29 and R30 are connected in series on the emitter thereof. A capacitor C19 is connected in parallel with the resistor R30. At low frequencies (below about 1,000 Hz) the effects of capacitors C18 and C19 may be ignored due to the relatively high reactance thereof. Gain is thus approximately the value of the collector resistor R28 divided by the sum of the series connected emitter resistors R29 and R30. However, as the frequency increases above about 60,000 Hz, capacitor C19 effectively bypasses resistor R30 and the gain increases. At even high frequencies (above about 200 kHz) capacitor C18 bypasses resistor R28 and the gain decreases. The amplified signal from this stage of the amplifier is then fed through a coupling capacitor C20 to a further, substantially similar amplifier stage. It should be noted that the capacitors C17 and C20 are chosen with a small value such that higher frequencies are able to pass through the capacitors; but lower frequencies, such as 60 cycle hum and the like, are filtered out by the capacitors due to the high reactance thereof. Thus, it can be seen that the gain is frequency dependent and rises to an optimum value and then begins to fall off.

The second amplifier stage is comprised of bias resistors R31, R32, transistor Q15, collector resistor R33, series connected emitter resistors R34 and R35 and capacitors C21 and C22 and is substantially the same as the first amplifier stage, except that the values of resistors R34 and R35 and capacitor C21 are slightly different from their corresponding components in the first stage due to the different load imposed on the second amplifier stage by the integrated circuit than is imposed on the first stage by the second stage. In other words, the gains of the two amplifier stages are substantially the same and the different values of the noted resistors and capacitor are selected to offset the load differences. The amplified output from the second stage is supplied through a coupling capacitor C23 to input pin 3 of integrated circuit chip 26. The integrated circuit 26 is a tone decoder phase locked loop with an open collector output at pin 8 connected through a resistor R36 with the alarm timer circuitry 17. The operating frequency of the integrated circuit 26 is determined by capacitor C24 on pin 6 connected with resistors R37 and R38 connected in series with pin 5. Capacitor C24 and resistors R37 and R38 are preferably temperature stable. Capacitor C25 connected on pin 1 prevents spurious outputs due to noise, and capacitor C26 on pin 2 determines the band width or how wide a frequency the integrated circuit looks for. This band width is set to maximum at 14% of center frequency.

Upon the presence of a proper signal on the perimeter loop 14 from the transmitter T and the supply of a resultant signal within the designated band width on the integrated circuit 26, the output at pin 8 goes to ground. This output is connected through resistor R36 to the juncture of resistor R39m, capacitor C27 and the base of transistor Q16. The voltage at the base of transistor Q16 is determined by the voltage divider action of resistors R36 and R39 and this voltage under the above conditions moves near ground, thus discharging capacitor C27 through resistor R36. Voltage at the emitter of transistor Q16 is determined by the voltage divider action of resistors R40 and R41, and transistor Q16 is thus back biased and cut off. Transistors Q17 and Q18 are thus also maintained in an off condition and the alarm 18 is not energized.

If the proper signal is now removed from the perimeter loop 14, as by moving the transmitter outside the loop a predetermined distance or removing the transmitter from the person thus opening switch S2, the integrated circuit 26 no longer receives the appropriate signal and the open collector at pin 8 shuts. The base of transistor Q16 remains low, however, because of the action of capacitor C27. As resistor R39 bleeds charge into the capacitor C27, voltage begins to rise to a positive level and at some point the base of transistor Q16 rises to 0.6 volts above its emitter voltage and it begins to conduct. The time required for transistor Q16 to begin to conduct after the collector at pin 8 shuts is set at 500 milliseconds. This time delay insures that only one coil of the transmitter is required to prevent the alarm going off. In other words, a signal of sufficient strength is being imposed on the perimeter loop 14 for 100 milliseconds out of every 300 millisecond period. Thus, there is a period of time of at least 200 milliseconds during which no signal is being applied to the perimeter loop. However, the resistor and capacitor network require 500 milliseconds for the capacitor to be charged to a point to turn on the transistor Q16. When transistor Q16 begins to conduct, current flows through resistor R42 and the base of transistor Q17 turning it on, whereby current flows through resistor R43 and LED 1 to the base of transistor Q18 turning it on. Transistor Q18 may be of any type that satisfies the current requirements of the alarm 18. Power for the alarm is taken from the unfiltered power supply at point D in FIG. 4. Light from the LED may be used as a visual indication for an alarm condition. Resistors R44 and R45 insure positive turn off of their respective transistors should transistor Q16 be in the non-conductive state.

If it is desired to monitor more than one transmitter or monitor activator, the circuitry within the dotted lines indicated at 29 in FIG. 5 and 30 in FIG. 6 is duplicated or repeated the desired number of times, with the respective integrated circuits 26 tuned to the respective monitor activator or transmitter frequency. The respective illuminated LED would indicate which transmitter is no longer inducing the proper signal in the perimeter loop, and thus would provide a visual indication to an observer of which transmitter has been moved outside the perimeter loop.

The ends 14' of the perimeter loop 14 are twisted together where they enter the house for connection to the monitor M to facilitate installation of the loop and also to insure that false alarms for improper signals are not obtained as a result of improper or careless installation of the loop wherein the ends would be brought into the house in spaced apart relationship such that a transmitter could be positioned between the spaced apart ends without inducing the proper signal into the loop.

Thus, according to the invention, a simple and economical apparatus is provided which enables a given area to be monitored or supervised such that a remote observer will have an indication at all times whether designated persons or objects and the like are within the given area. Further, the apparatus may be made portable if desired for relocation to different designated areas. Additionally, the coupling between the transmitter and perimeter loop is by magnetic induction or coupling, and the monitor circuitry is constructed to filter out extraneous noise and thus the apparatus is insensitive to spurious signals, such as caused by 60 cycle hum, automotive electronics, garage door openers and the like. Moreover, the transmitter includes three oscillator coils arranged mutually perpendicular to one another such that proper magnetic coupling between the transmitter and the perimeter loop is insured at all times, regardless of the orientation of the transmitter.

Further, although the invention has been described herein as particularly applicable to an apparatus for monitoring the location of small children and the like, it could equally as well be applied to the monitoring of pets or other animals or even to the location of objects, such as vehicles and the like.

As noted previously, the transmitter may be housed in any structure appealing to a child or the like, such as, for example, a badge, and the switch S2 may be incorporated in the fastening device for the badge or the like, such that if the child removes the badge or the like from his person, opening of the switch S2 will be required, with the result that an alarm will be sounded. Further, the transmitter may be placed in the collar or the like of an animal, if desired, for monitoring the whereabouts of the animal.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A perimeter alarm apparatus for guarding or monitoring a designated area to determine the presence or absence of designated persons or objects within the area, comprises: a transmitter having means for attachment thereof to the designated person or object; said transmitter having electrical circuit means for continuously and cyclically producing a changing magnetic field, said electrical circuit means including a plurality of coils arranged angularly relative to one another and connected with means for alternately and sequentially energizing the coils whereby a plurality of changing magnetic fields of different polarity are produced to minimize the effect of different orientations of the transmitter; a monitor for monitoring the presence of the transmitter and including a wire loop extending around the perimeter of the designated area; monitor electrical circuit means connected with the wire loop for detecting the presence of a signal induced on the loop by the magnetic coupling between the transmitter and loop; said changing magnetic field and wire loop being related such that a signal of proper strength is magnetically induced on the loop whenever the transmitter is within the area bounded by the loop, but when the transmitter is a predetermined distance beyond the boundary defined by the wire loop, a proper signal is not imposed on the loop; and alarm means connected with said monitor electrical circuit means for indicating when the transmitter is not inducing a proper signal on the loop.

2. A perimeter alarm apparatus as in claim 1, wherein the monitor electrical circuit includes means for filtering out spurious signals to thereby prevent false alarms.

3. A perimeter alarm apparatus as in claim 1, wherein the plurality of coils comprise three coils mutually perpendicularly arranged.

4. A perimeter alarm apparatus as in claim 3, wherein the transmitter electrical circuit means includes a three state sequencer and three oscillators connected with the sequencer for sequential operation of the oscillators each for a predetermined period of time.

5. A perimeter alarm apparatus as in claim 4, wherein the monitor electrical circuit means includes a time delay to prevent energization of the alarm until a perdetermined period of time after detection of the absence of the correct signal from the perimeter loop, said period of the predetermined time delay being greater than the period of time required for one cycle of operation of the oscillators.

6. A perimeter alarm apparatus as in claim 1, wherein the transmitter and monitor are portable for relocation to other designated areas.

7. A perimeter alarm apparatus as in claim 1, wherein said transmitter attaching means is connected with switch means in the transmitter electrical circuit means, said switch means being responsive to removal of the transmitter from the person or object for de-energizing the transmitter when the transmitter is removed from the person or object, whereby an alarm is given.

8. A perimeter alarm apparatus for guarding or monitoring a designated area to determine the presence or absence of designated persons or objects within the area, comprises: a transmitter having means for attachment thereof to the designated person or object; said transmitter having electrical circuit means for continuously and cyclically producing a changing magnetic field; said transmitter attaching means connected with switch means in the transmitter electrical circuit means, said switch means being responsive to removal of the transmitter from the person or object for de-energizing the transmitter when the transmitter is removed from the person or object, whereby an alarm is given; a monitor for monitoring the presence of the transmitter and including a wire loop extending around the perimeter of the designated area; monitor electrical circuit means connected with the wire loop for detecting the presence of a signal induced on the loop by a magnetic coupling between the transmitter and loop; said changing magnetic field and wire loop being related such that a signal of proper strength is magnetically induced on the loop whenever the transmitter is within an area bounded by the loop, but when the transmitter is a predetermined distance beyond the boundary defined by the wire loop, a proper signal is not imposed on the loop; and alarm means connected with said monitor electrical circuit means for indicating when the transmitter is not inducing a proper signal on the loop.

9. A perimeter alarm apparatus as in claim 8, wherein the monitor electrical circuit means includes filter means and amplifier means for filtering out signals having frequencies other than the desired frequency and for amplifying the desired signal.

10. A perimeter alarm apparatus as in claim 8, wherein said monitor electrical circuit means includes an integrated circuit chip having an open collector output, said open collector output remaining open so long as a signal of the proper strength and frequency is imposed on the loop and supplied to the chip, but said open collector being shut when the proper signal is missing, said output connected with the time delay to set the time delay when the signal is missing and to reset the time delay when the signal is present, said time delay connected within the alarm means to maintain the alarm means de-energized so long as the time delay is reset before expiration of the predetermined period of time after absence of the proper signal is detected and to enable energization of the alarm means if the proper signal is missing longer than said predetermined period of time.

* * * * *